G. COOK.
Harrow.

No. 35,563.

Patented June 10, 1862.

Witnesses:
Theodore Potter
Janus G. Barr

Inventor:
George Cook

UNITED STATES PATENT OFFICE.

GEORGE COOK, OF BRISTOL STATION, ASSIGNOR TO HIMSELF AND WM. SCARLETT, OF AURORA, ILLINOIS.

IMPROVEMENT IN HARROWS.

Specification forming part of Letters Patent No. 35,563, dated June 10, 1862.

*To all whom it may concern:*

Be it known that I, GEORGE COOK, of Bristol Station, in the county of Kendall, in the State of Illinois, have invented a new, useful, and important Improvement in Harrows; and I do hereby declare that the following is a full and exact description thereof, which I have prepared with a view to the obtaining of Letters Patent therefor.

The accompanying drawings form a part of this specification, and similar letters of reference indicate like parts in all the figures.

Figure 1:
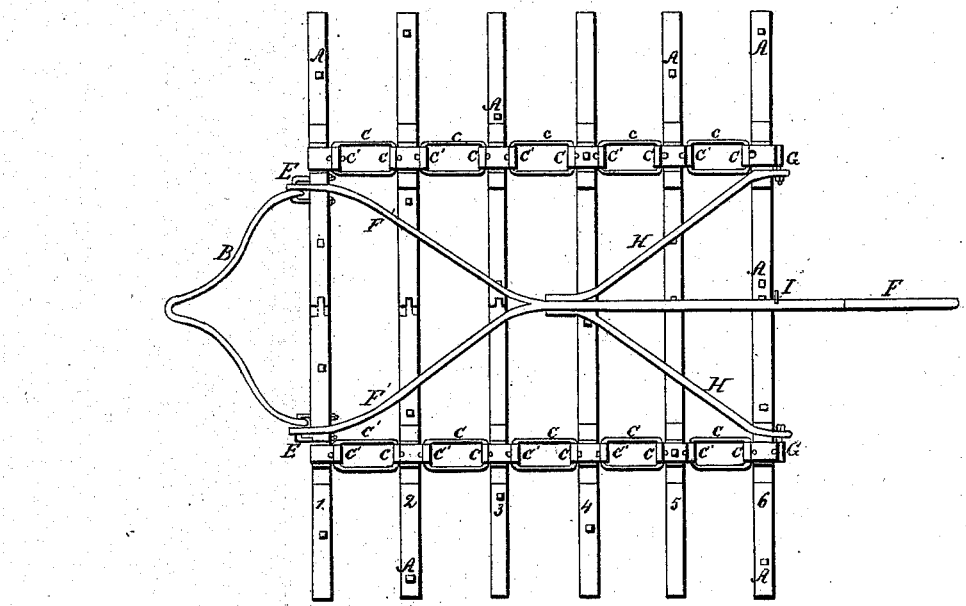
Figure 2:
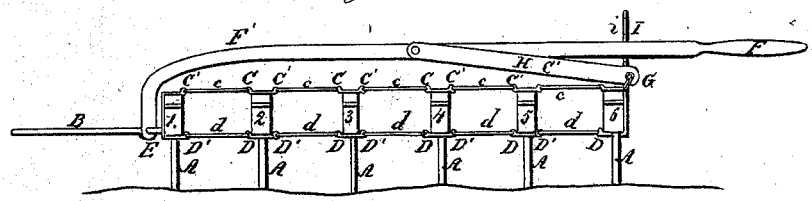
Figure 3:
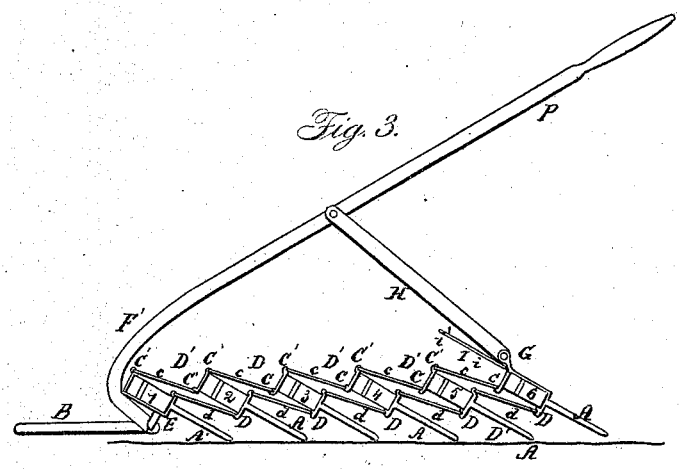

Figure 1 is a plan view, and Fig. 2 is a side view, of my improved harrow when in the condition for efficient service. Fig. 3 is a side view of the same when in the condition in which it may be placed for discharging sods or other obstructions.

My invention provides for the ready discharge of obstructions without the labor of lifting the harrow and without requiring any rotating shafts or other refined mechanism.

The mechanism of my harrow is composed entirely of what may be termed a "toggle-lever" and a series of simple chain-links peculiarly arranged relatively to the beams of the harrow. The sods or other clogging material are by this invention discharged at the will of the attendant by simply inclining the teeth for a brief period and then restoring them to their position for working by the raising and lowering of the hand-lever and its toggle connections, as represented.

To enable others skilled in the art to make and use my invention, I will proceed to describe it by the aid of the figures and of the letters of reference denoted thereon.

A are the teeth, which may be of any known form or material; and B is the link by which the animals are connected to drag the harrow.

1 2 3, &c., are cross-beams, jointed at their centers, as represented, so as to better adapt the action of the machine to irregular ground. The teeth A are fixed in these beams in any approved manner, so as to be governed and operated thereby. On the upper side of each of these beams are fixed stout eyes C C', as represented, and on the under side of each are fixed similar stout eyes, D D'. Links $c$ connect the several eyes C C', and links $d$ connect the several eyes D D', in the manner represented. These links and eyes compel the several beams 1 2 3, &c., to sustain positions parallel, or nearly so, each to the other, but allow the whole to be inclined or partially rocked, so as to cause the several teeth A to stand nearly perpendicularly, or at an angle, as represented, the position being determined by the other parts now to be described.

To the same stout staples E which receive the draft of the animals, a little in front of the foremost beam, 1, are hinged the forks F' of a long lever, F, in the manner indicated, so that the lever may turn freely upon the staples. The other end of the lever F extends over the back of the harrow, and is adapted to be raised or lowered by the hands of the attendant.

To suitable stout eyes, G, above the rearmost of the cross-beams, 6, are hinged the ends of the rods or links H. The other ends of these rods H are hinged to the lever F. The connections of these rods H to the eyes G and lever F are both made by suitable pins, as represented, so that they allow the parts to freely turn one upon the other.

It will be observed that the positions of the staples E and eyes G depend upon the elevation of the lever F, so that the depression of the latter increases the distance of E from G, while the elevation of the lever diminishes such distance. It will also be observed that the several links $c$ and $d$, by reason of their being each of less length than the distance between the central lines of the several beams 1 2 3, &c., and being connected to eyes C C' and D D' in the manner represented—to wit, C and C' being not identical in position, but at a considerable distance apart—compel the several beams 1 2, &c., to stand squarely and hold the teeth A perpendicularly, or nearly so, when the said links are strained, so as to extend the harrow by the depression of F, but allow the beams 1 2, &c., to turn partly over, so as greatly to incline the teeth and discharge the rubbish whenever the lever F is depressed, so as to extend the harrow to its utmost capacity.

The operation of the harrow and its construction is now fully apparent. The depth of the several beams 1 2, &c., is made greater by splicing suitable pieces upon the top at the points where the eyes C C' are fixed, so as to give the links $c$ and $d$ sufficient leverage to sustain the forces acting upon the teeth A below. The several eyes are formed from pieces of stout rolled iron properly bent and punched as a convenient means of cheaply producing and attaching them, and these pieces must be of such length as to hold the eyes C and C' on any given beam at a considerable distance apart, as represented, and the eyes D and D' also at a considerable distance, so that the simple act of extending the harrow shall tend to hold the teeth with proper firmness in their true perpendicular, or nearly perpendicular, positions. So long as the harrow is clear of obstructions the lever F is held down and the teeth A maintained in their operative positions; but whenever sods or other clogging matters encumber the teeth the attendant elevates the lever F, causing it to turn on the staple E, because the beams 1 2 3, &c., turn more rapidly than the lever inclines.

A suitable post or upright, I, on the top of the beam 6 is adapted to receive the lever F within a suitable notch in its side, near the top. The attendant is not therefore required to hold the lever F down while the harrow is performing its work successfully. He has only to press it down or to allow it to descend by its weight until the lever F is opposite the notch in the side of I, and then to move it laterally into said notch, after which it will be retained thereby until it is again released by a movement in the opposite direction. Any ordinary spring-catch or other well-known means may be employed, if desired, to avoid any liability of the lever F to release itself from I by accidental movements and concussions.

I have so far spoken of the effect of the increasing of the distance between E and G by the depression of the lever F and the diminishing of such distance by the elevation of the lever F as only an extension and contraction of the harrow, and have described the effects in plumbing and inclining the teeth as if due to the extension and contraction alone; but there is, in fact, another feature of importance in my harrow, which is that the eyes G are much more elevated in their positions on the cross-beam 6 than are the staples E in their positions on the cross-beam 1. In consequence of this difference in the elevation of the front and rear centers the forces acting between these points through the lever F and links or rods H act to some extent as a diagonal force. This diagonal position of the line of the force aids the machine to operate, as described, and to resist the action of the earth upon the ends of the teeth without throwing any too severe a strain upon any of the parts. It also tends to cause the teeth to assume a slightly-inclined position in the opposite direction to that in which it discharges the sods—a fact which will prove itself very readily by experiment, and which tends to compensate for all elasticity and lost motion of the parts, and to maintain the teeth in their fully upright position while in use.

It will also be observed that the center E is, by reason of the length and position of the staple, carried considerably forward of the front of the beam 1. This is important, because it aids the action of the lever F and links H in holding the teeth erect at the proper time, and also because it causes the draft of the animals to be applied in such a line as aids the restoring of the harrow to its working condition after having its teeth thrown into the inclined position. Fig. 3 shows this latter action very clearly, as also all the other relations of the parts when the lever F is raised. A moderate force applied to elevate F suffices to discharge the obstructions, and a like moderate force applied to pull backward and downward upon F suffices, when aided as it is by the line of draft through B E, to effect the instant restoration of the harrow to its proper working condition again.

It will be observed that by changing the proportions of the parts, or by preserving the proportions as they are represented, and planting the teeth A at an angle instead of perpendicularly in the several beams 1 2 3, the teeth A may be made to take any desired position when working either vertical, as shown, or inclined therefrom forward or backward to suit the conditions of the soil or the purpose of the operation. Such a change of the position of the teeth may also be effected to some extent by the use of several notches in the post I, as indicated by $i$ and $i'$, so that by resting the lever F in one or the other at will it may be confined in a more or less elevated position, and the teeth A be more or less inclined in either direction, as circumstances may dictate. This is an advantage not possessed by any harrow heretofore known to me, and one of much practical importance. It may be well to so proportion and arrange the parts that when the lever F is in its extreme lowest position—i. e., in the notch $i$—the teeth will stand considerably forward, and when it is in the notch $i'$ they will stand about perpendicularly.

Having now fully described my invention and explained the principles on which it acts and the mode by which it is successfully operated, what I claim as new therein and as my invention, and desire to secure by Letters Patent, is—

1. Inclining the teeth of a harrow at the will of the operator, so as to discharge the obstructions accumulated therein, and restoring the same to their positions for working without lifting the harrow, all substantially in the manner herein set forth.

2. The arrangement of the teeth A, beams 1 2 3, &c., eyes C C' and D D', and any suitable force for extending and contracting the same, so as to operate as herein set forth.

3. The employment of the lever F and links H, so arranged relatively to the beams 1 2 3, &c., and to the eyes C C' and D D' and links $c$ and $d$ as to operate as herein set forth.

4. The uniting or connecting of the rods H to an eye, G, which is higher than the eye or staple E, to which F is connected, so that the extending and contracting force applied to the harrow by the elevation and depression of F shall act diagonally in the vertical plane, as herein set forth.

5. Connecting the lever F and the drag-link B to a point, E, forward of and lower than the center of the front beam, 1, substantially as and for the purpose set forth, when the parts are arranged relatively to the several other cross-beams 2 3, &c., and their connections, and to the links or bars H, as shown.

6. Securing the lever F in different positions by means of the notches $i\ i'$ in the post I, in combination with the other parts, substantially as represented, for the purpose of holding the teeth firmly in the several positions desired for working in various soils.

GEORGE COOK.

Witnesses:
 THEODORE POTTER,
 JAMES G. BARR.